(12) United States Patent
Ruutu et al.

(10) Patent No.: US 7,373,156 B2
(45) Date of Patent: May 13, 2008

(54) PROVIDING TIME INFORMATION

(75) Inventors: Jussi Ruutu, Espoo (FI); Ville Ruutu, Espoo (FI); Jarko Niemenmaa, Espoo (FI)

(73) Assignee: Nokia Corporation, Espoo (FI)

( * ) Notice: Subject to any disclaimer, the term of this patent is extended or adjusted under 35 U.S.C. 154(b) by 764 days.

(21) Appl. No.: 10/821,865

(22) Filed: Apr. 12, 2004

(65) Prior Publication Data

US 2005/0197140 A1 Sep. 8, 2005

(30) Foreign Application Priority Data

Feb. 18, 2004 (FI) ................................. 20040261

(51) Int. Cl.
*H04Q 7/20* (2006.01)
(52) U.S. Cl. ................. 455/456.2; 455/414.1; 455/414.2
(58) Field of Classification Search ............. 455/456.2, 455/414.1, 502, 456.1, 422.1, 560, 13.2, 455/552.1, 414.2; 370/331, 507
See application file for complete search history.

(56) References Cited

U.S. PATENT DOCUMENTS

| | | | |
|---|---|---|---|
| 6,011,955 A * | 1/2000 | Tsuchiyama | 340/7.1 |
| 6,452,541 B1 * | 9/2002 | Zhao et al. | 342/357.06 |
| 6,636,744 B1 * | 10/2003 | Da | 455/456.1 |
| 2001/0022779 A1 * | 9/2001 | Wheatley et al. | 370/252 |
| 2005/0070223 A1 * | 3/2005 | Camp et al. | 455/13.2 |
| 2006/0205436 A1 * | 9/2006 | Liu et al. | 455/560 |
| 2007/0123248 A1 * | 5/2007 | Krasner et al. | 455/422.1 |
| 2007/0127416 A1 * | 6/2007 | Terasawa et al. | 370/331 |

FOREIGN PATENT DOCUMENTS

| | | |
|---|---|---|
| EP | 1 337 058 A2 | 8/2003 |
| JP | 2000-59325 | 2/2000 |
| WO | WO 02/075349 A2 | 9/2002 |
| WO | WO 03/060547 A1 | 7/2003 |

* cited by examiner

*Primary Examiner*—Tan Trinh
(74) *Attorney, Agent, or Firm*—Squire, Sanders & Dempsey L.L.P.

(57) ABSTRACT

A method for providing time information comprises sending time information to at least one communications device and receiving information indicating error in received time information from at least one of said at least one communications device, said error in received time information having been determined in a communications device. In a communications device, first time information from a communications system is received and second time information with respect to an external time frame is determined. Thereafter an error in first time information based on at least said second time information is determined, and information indicating said error in said first time information is sent to said communications system. A communications device, a communications system and a network element for a communications system are also discussed.

30 Claims, 7 Drawing Sheets

PROVIDING TIME INFORMATION

BACKGROUND OF THE INVENTION

1. Field of the Invention

The present invention relates to providing time information to a communications device.

2. Description of the Related Art

Positioning services have become very popular in the recent years. Positioning refers here to determining the location of a receiver device. The receiver device may be capable of determining its position based on signals it receives. The signals can be sent either from a specific positioning system or, for example, from a cellular communications system. Alternatively, the receiver device may act as a measurement device and send measurement results to a further unit, which then determines the location of the receiver device.

The most widely used positioning system is the Global Positioning System (GPS). GPS positioning is based on measuring relative time of arrival of signals sent simultaneously from GPS satellites. The locations of the GPS satellites at the time of sending the signal can be determined. It is possible to determine the location of the GPS receiver by determining the distance between GPS satellites and the GPS receiver using time of arrival measurement results together with the exact GPS time.

In theory, three time of arrival measurements would be enough to calculate the GPS receiver's position and also the velocity, if the exact GPS time is known to the GPS receiver. In practice, a GPS receiver has low-cost, low-accuracy local oscillator as a local clock. Therefore a fourth time of arrival measurement is typically needed to determine the difference between the local time and the GPS time. This means that for successfully locating a GPS receiver, it typically needs to receive signals simultaneously from at least four GPS satellites.

Each signal transmitted by a GPS positioning satellite carries a navigation message, which includes both data unique to the transmitting satellite and data common to all satellites. The navigation message contains time information, satellite clock correction data, ephemeris (precise orbital parameters), almanac (coarse orbital parameters), health data for all satellites, coefficients for the ionospheric delay model and coefficients to calculate the Universal Coordinated Time (UTC) from the GPS system time. The navigation message consists of 25 frames, and the frames are organized in such a way that a GPS receiver is able to obtain satellite-specific data (ephemeris) for exact position calculation within 30 seconds. This 30 seconds is the minimum time-to-first-fix (TTFF) of GPS in the general case. It takes 12.5 minutes to receive all the 25 frames completely.

As mentioned above, GPS positioning is dependent on obtaining accurate GPS time and navigation data and on performing distance measurements. For carrying out GPS positioning successfully, signals from three or four GPS satellites need to be received properly for demodulating navigation data needed for the distance measurements. GPS provides accurate positioning results especially in rural areas, where a GPS receiver can have a line-of-sight with the needed number GPS satellites. In urban areas, where buildings may cause attenuation of the GPS signals and reflections to the signal propagation paths, especially the reception of the navigation data may not be successful.

The distance measurements need to be performed at the GPS receiver, but the GPS time and navigation data may be provided to the GPS receiver also via another system. In Assisted GPS (AGPS), at least part of the GPS time and/or navigation data is provided as location assistance data to a GPS receiver by means of some other signals than by the GPS satellite signals. By providing navigation data and/or exact GPS time as location assistance information, the availability and the response time of GPS positioning can be enhanced. For example, the Time-To-First-Fix can be shortened. By obtaining location assistance information, a GPS receiver can perform distance measurements and optionally also calculate its position even when the GPS signals the GPS receiver receives are so weak that the navigation message cannot be properly demodulated. If the GPS time can be transferred to a GPS receiver with better accuracy than 2-3 seconds, it already helps in positioning. The best assistance is obtained with better than 10 microseconds accuracy.

A communications system, for example a cellular communications system, may be used for transmitting the location assistance information. The communications system may be equipped with a plurality of reference GPS receivers for obtaining and determining the location assistance information. Typically each reference GPS receiver is associated with a serving area. The location assistance information sent to GPS receivers within a serving area typically includes information relating to those GPS satellites, from which the reference GPS receiver of the respective serving area is able to successfully receive GPS signals. The GPS receivers, to which location assistance information is transmitted using a cellular telecommunications network, are typically integrated to a communication device capable of supporting communication via the communications system.

There are at least two alternatives for providing to a communication device information about a reference time for positioning. The first alternative is to tie the reference time of the positioning system to an event or events in the communications network. For example, the reference time may be tied to a start of a certain frame transmitted from a certain network element. For this purpose, time differences between base stations of a communication network typically need to be measured. A Location Measurement Unit is defined in the 3GPP (Third Generation Partnership Project), and it is responsible, for example, for measuring time differences between base stations and reporting them to a serving mobile location center. From the measurements the serving mobile location center defines the time correspondence between the reference time and GSM frames. Using this first alternative it is possible to deliver accurate reference time to a communications device. The accuracy may be better than 10 microseconds.

A second alternative is to estimate the current time of the positioning system in the communications system and send this information to the communications device. A GPS clock or receiver connected to the communication system may be used for determining current GPS time. This second alternative means, in practice, delivery of less accurate reference time. Providing reference time information without reference to external events in location assistance data is an example of this second alternative. When information about the reference time is sent to a communications device, there is a delay between the time instant when the reference time of the positioning system is determined and when the communications device receives the reference time information.

Especially if it is desired to provide a user-plane based positioning solution, the first alternative for providing reference time is not likely, as it would require a connection between a location measurement unit or a corresponding unit and a user-plane application.

To provide more accurate time information about the positioning system, it is possible to try to take into account the transfer delay. For example, for packet data transfer using IP (Internet Protocol) connections, a ping procedure may be used to measure the transfer delay. It is, however, possible that ping or similar procedures cannot be used due to data channel characteristics or standards support problems. As an example, ping assumes the existence of Internet Control Message Protocol (ICMP) in the communications device. The ICMP is part of the TCP/IP (Transfer Control Protocol/Internet Protocol) protocol suite. Ping therefore does not work if the communications device does not have a proper protocol stack. Moreover, depending on the settings and configurations of the network operator, the ICMP data packets that are used by ping, may not be able to reach the communications device. For example, the communications device does not have data connection subscription or some intermediate network element (such as a firewall or a proxy) blocks the IP packets carrying ICMP messages.

It is appreciated that although problems relating to providing accurate time information relating to GPS are discussed above, similar problems may arise in connection with delivering time information for other purposes.

Embodiments of the present invention aim to provide a feasible solution for providing time information accurately to a communications device.

SUMMARY OF THE INVENTION

A first aspect of the present invention relates to a method for providing time information, the method comprises the steps of sending time information to at least one communications device; and receiving information indicating an error in a received time information from at least one of the at least one communications device, the error in the received time information having been determined in a communications device.

A second aspect of the present invention relates to a communications system, which is configured to send time information to at least one communications device; and receive information indicating an error in a received time information from at least one of the at least one communications device, the error in the received time information having been determined in a communications device.

A third aspect of the present invention relates to a network element for communications system, the network element configured to send time information to at least one communications device; and receive information indicating an error in a received time information from at least one of the at least one communications device, the error in the received time information having been determined in a communications device.

A fourth aspect of the present invention relates to a communications device, which is configured to receive a first time information from a communications system; determine a second time information with respect to an external time frame; determine an error in the first time information based on at least the second time information; and send information indicating the error in the first time information to the communications system.

A fifth aspect of the present invention relates to a method for operating a communications device, the method comprising the steps of receiving a first time information from a communications system; determining a second time information with respect to an external time frame; determining an error in the first time information based on at least the second time information; and sending information indicating the error in the first time information to the communications system.

A sixth aspect of the present invention relates to a communications device, the communications device comprising: means for receiving a first time information from a communications system; means for determining a second time information with respect to an external time frame; means for determining an error in the first time information based on at least the second time information; and means for sending information indicating the error in the first time information to the communications system.

A seventh aspect of the present invention relates to a network element for a communications system, the network element comprising: means for sending time information to at least one communications device; and means for receiving information indicating an error in a received time information from at least one of the at least one communications device, the error in the received time information having been determined in a communications device.

An eighth aspect of the present invention relates to a communications system, the communications system comprising means for sending time information to at least one communications device; and means for receiving information indicating an error in a received time information from at least one of the at least one communications device, the error in the received time information having been determined in a communications device.

BRIEF DESCRIPTION OF THE DRAWINGS

Embodiments of the present invention will now be described by way of example only with reference to the accompanying drawings, in which.

DETAILED DESCRIPTION OF THE EMBODIMENTS OF THE INVENTION

In embodiments of the inventions, a communications device determines time with respect to an external time frame. Then the communications device determines an error in the time information it received from the communications system. Thereafter information indicating the estimated error in the received time information is sent to the communications system.

The external time frame in this description and in the appended claims may refer to any time frame separate from the system clock or time frame of a communications system.

As an example of an external time frame, some embodiments below use the GPS time.

Figure 1:
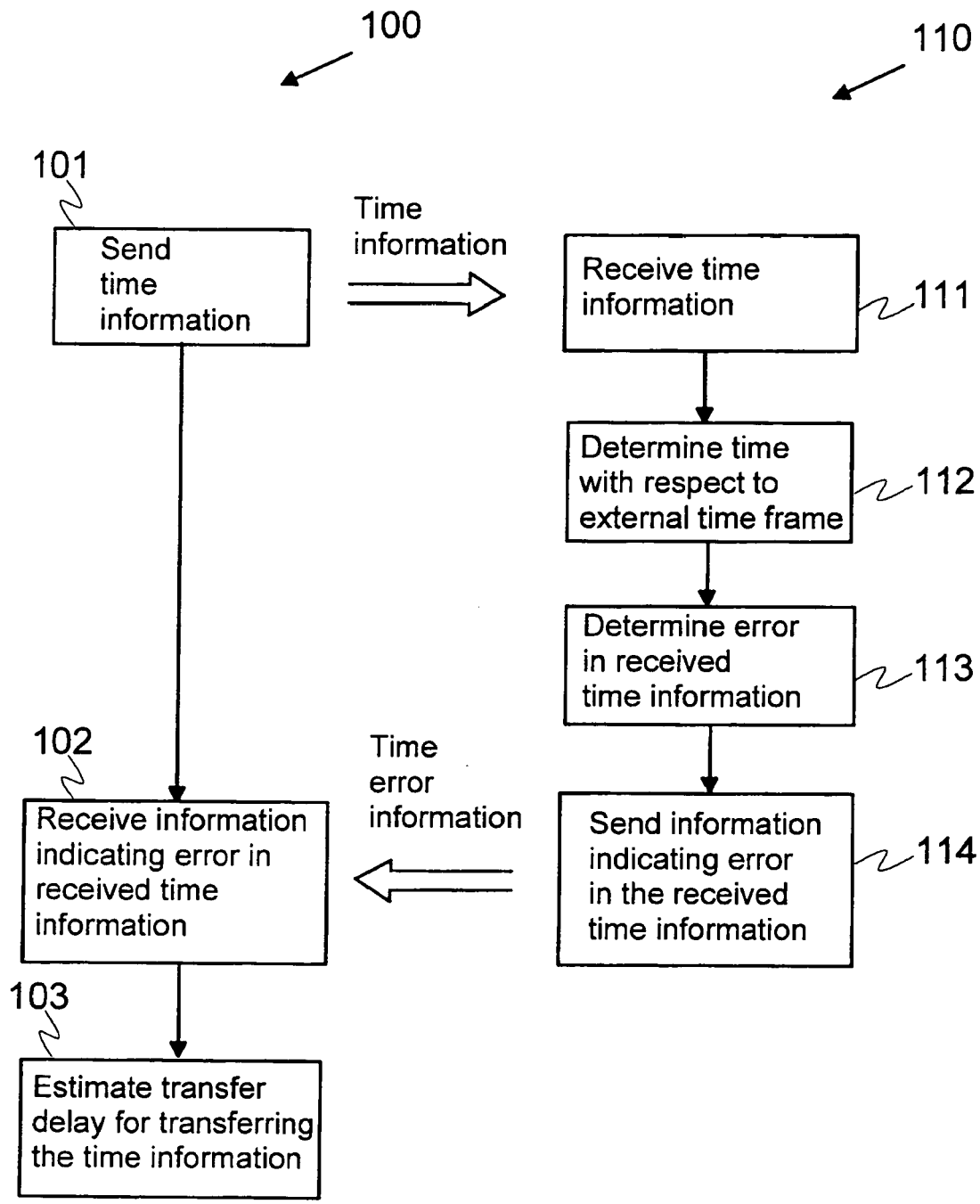
FIG. 1 shows a flowchart relating to methods in accordance with a first embodiment of the invention.

FIG. 1 shows a flowchart relating to methods 100 and 110 in accordance with a first embodiment of the invention. This first embodiment relates to transferring time information to a communications device. The method 100 is carried out in a communications system, and method 110 is carried out in a communications device. In step 101 time information is sent from a communication system to a communication device. The time information may, for example, form part of a location assistance data relating to a GPS system. In step 111, the communication device receives the time information. In step 112, the communication device determines time with respect to an external time frame. The external time frame may be, for example, the GPS time, and the communication device having the necessary GPS functionality determines the GPS time based on signals received from the GPS satellites, typically with the help of location assistance data. In step 113, the communications device determines the error in the received time information. In step 114, the communications device sends information indicating the determined error to the communications system. In step 102, the communications system receives information indicating the error in the time information received by the communications device, and in step 103 the communications system estimates a transfer delay for transferring said time information.

Figure 2:
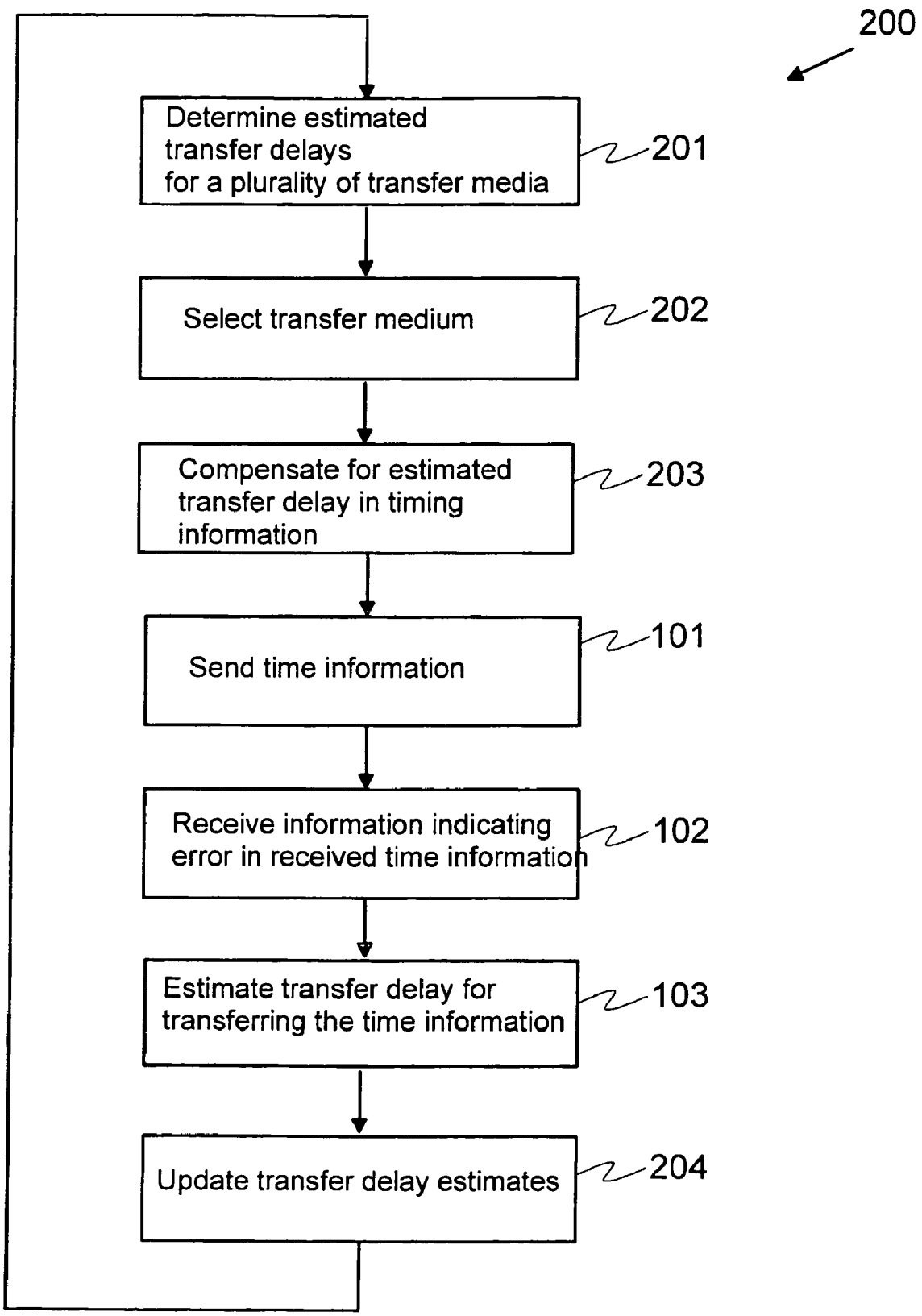
FIG. 2 shows a flowchart relating to a method in accordance with a second embodiment of the invention.

FIG. 2 shows a method 200 relating to a second embodiment of the present invention. In this method, there are a plurality of transfer media through which the time information may be sent. Transfer delays for the transfer media are estimated statistically using information received from communications devices relating to the errors in time information. Transfer delay estimates may be used for selecting a suitable transfer medium for time information. Furthermore, it is possible to compensate for the estimated transfer delay.

In step 201, estimated transfer delays are determined for a plurality of transfer media. This may be done by updating transfer delay information each time information indicating error relating to the time information is received from a communications device (see step 204). In step 202, a transfer medium is selected for transferring time information to a specific communications device. The transfer medium is typically selected using the estimated transfer delays. In step 203, the expected transfer delay is compensated for in the time information. The following steps 101-103 are the same steps as in method 100. In step 204, the transfer delay estimate relating to the selected transfer medium is updated.

In the following, GPS time information is used as an example of time information. It is, however, appreciated that the present invention is not restricted providing time information relating to the GPS system, but may be used for providing any time information.

Figure 3:
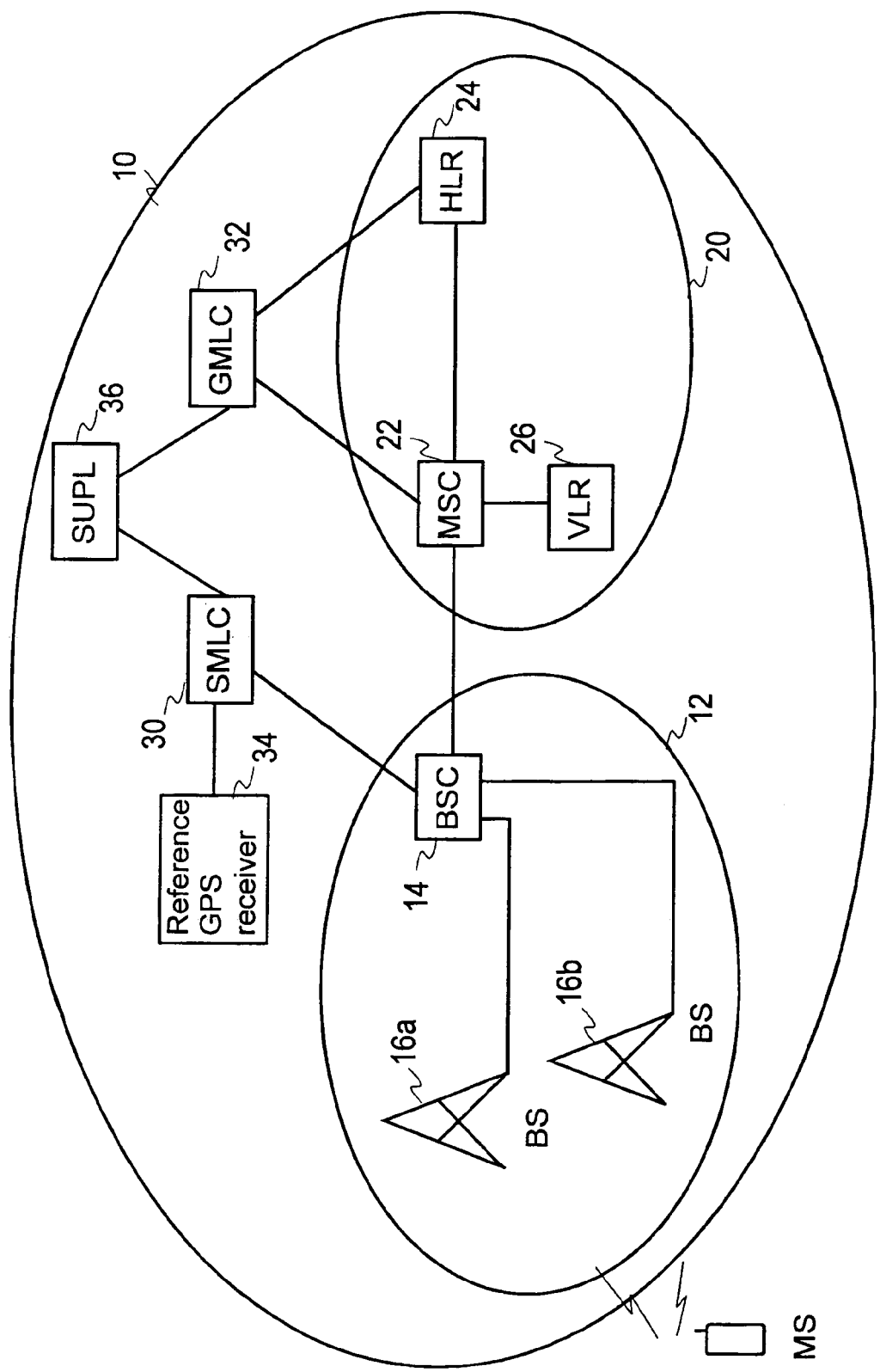
FIG. 3 shows schematically a communication system with which embodiments of the invention can be used.

FIG. 3 shows, as an example, a schematic view of a cellular telecommunications network 10 supporting positioning services. The cellular telecommunications network 10 contains a radio access network 12 and a core network 20. The radio access network 12 has a plurality of base station controllers (BSC) 14 responsible for controlling the radio resources. A base station controller 14 may control a plurality of base stations (BS) 16, which are typically connected to a base station controller with a fixed line connection or, for example, with a point-to-point radio or microwave link. A base station controller 14 is responsible for controlling and managing the radio resources in a base station 16. The core network 20 contains Mobile Switching Centers (MSC) 22, a Home Location Register (HLR) 24 and Visitor Location Registers (VLR) 26. FIG. 3 shows, as an example, only one BSC, MSC and VLR.

It is appreciated that the names of the network elements of a cellular telecommunications network may vary. The naming of the network elements in connection with FIG. 3 is in accordance with the Global Mobile Telecommunications System (GSM), but similar network elements are found also in other cellular telecommunication systems. For example, in Universal Mobile Telecommunications System (UMTS) a transceiver network element is called a node B, and a control network element responsible for controlling radio resources is a Radio Network Controller. A communications device is called user equipment in UMTS and a mobile station in GSM. It is evident to a person skilled in the art that in FIG. 3 a GSM network is used as an example of a cellular communications system.

Location services architecture is logically implemented in the GSM network 10 through the addition of one network node, the Mobile Location Center (MLC). A MLC can be either a Serving MLC (SMLC) 30 or a Gateway MLC (GMLC) 32. The SMLC manages the overall coordination and scheduling of resources required to perform positioning of a mobile station. The SMLC typically calculates the final estimate and accuracy for the location of a mobile station. The GMLC is a node, which an external LCS client accesses for obtaining location information about a mobile station. The GMLC obtains location area of the mobile station from Home Location Register after proper authentication, and can then obtain information about the location of the mobile station from the serving MLC.

For positioning a communication device of a cellular telecommunications network using a satellite positioning system, the communication device needs to be provided with functionality to receive and process signals from satellite positioning system satellites. A communications device equipped may locate itself without location assistance information, if it receives signals from positioning system satellites successfully. Even in this case location assistance data may make the positioning faster. A communications device may alternatively be capable of determining only satellite positioning system time and distances from the positioning system satellites. The distance measurement results are transmitted to a further computing element, where the location of the communications device is determined. The further computing element is often called a location server.

For providing location assistance information to the communications device, the communications system is equipped with reference satellite positioning system receivers. FIG. 3 shows, as an example, a reference GPS receiver 34 connected to the SMLC 30.

It is evident that in other location service architectures, the network elements having similar functionality as the Mobile Location Center may have different names. Below term location server is used to refer to a network element providing functionality relating to positioning of a communication device.

Figure 4:
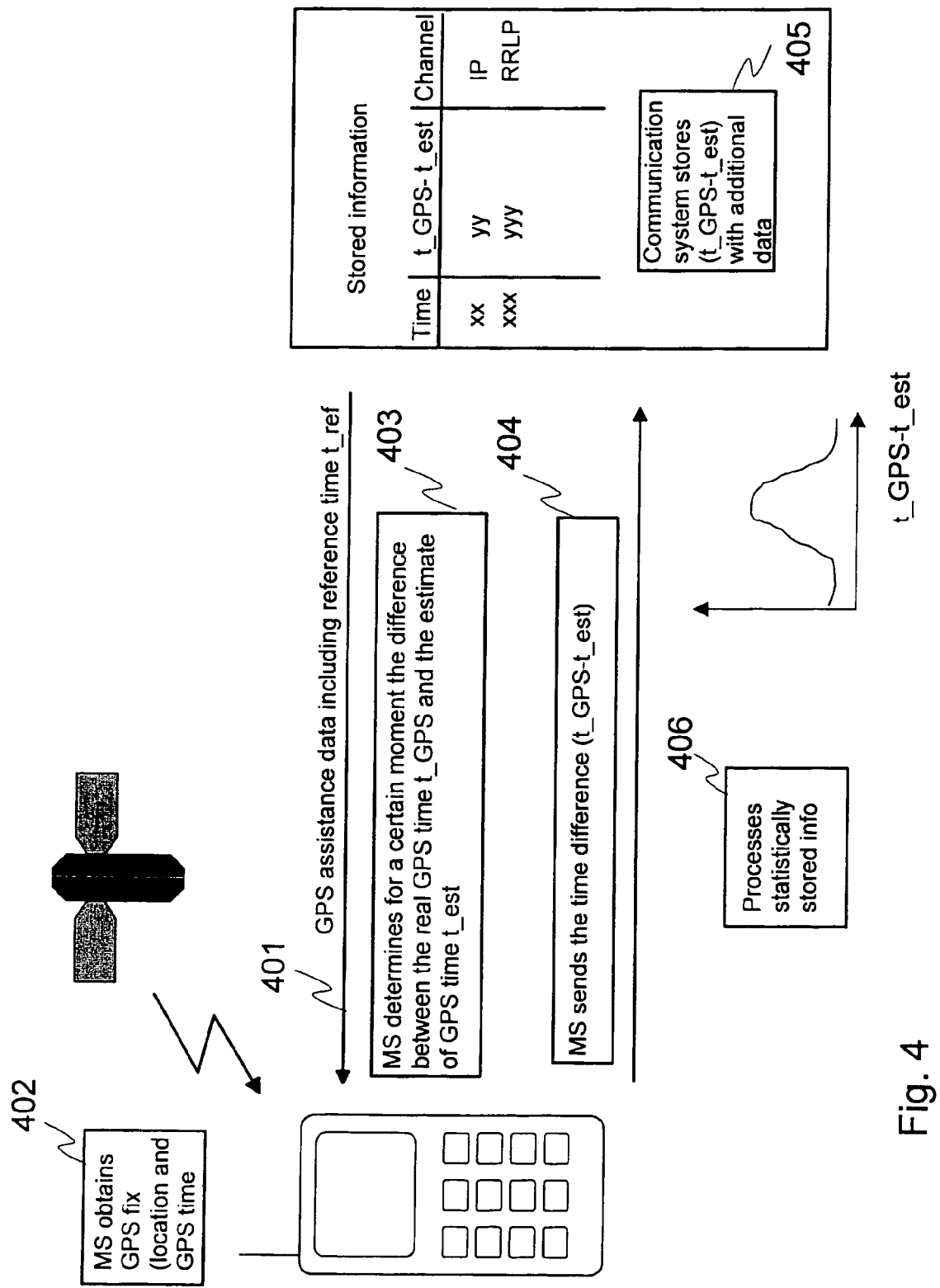
FIG. 4 shows schematically a method relating to assisted positioning in accordance with a third embodiment of the invention.

A third embodiment of the invention relates to sending time information relating to GPS, or other satellite positioning system, to a mobile station via a communications system. FIG. 4 shows schematically a method where a mobile station with an A-GPS receiver receives the location assistance information from the communications system. Time information contained in the location assistance information represents a reference time for GPS positioning. If/when the mobile station gets a GPS location fix and at the same time GPS time fix, the mobile station estimates the error in the reference time received from the communications system. In other words, the mobile station estimates the time difference between the GPS time as estimated based on the received time information and the real GPS time from the GPS receiver having GPS fix. The mobile station sends this time error information back to the communications system. The communications system can estimate statistically the transfer delay and the related GPS reference time inaccuracy for other assistance data delivery transactions.

The third embodiment is discussed in more detail next with reference to FIG. 4. The communications system sends GPS location assistance information including time information t_ref for GPS to the mobile station (arrow 401). The GPS location assistance information may be sent, for example, in a location request message. The network element generating the GPS location assistance data may be the Serving Mobile Location Center (SMLC) in 3GPP standardized GSM and UMTS A-GPS solutions. It may alternatively be a network server as planned for OMA (Open Mobile Alliance) Overlay A-GPS solution. The mobile station tries to obtain a GPS fix with the available location assistance data (step 402 in FIG. 4). If a GPS fixed is successfully obtained, the mobile station gets both a GPS location estimate and also the real (accurate) GPS time.

The mobile station estimates for a certain moment the time difference between the real GPS time t_GPS and the estimate of GPS time t_est that is based on reference time t_ref (step 403 in FIG. 4). An example of this procedure can be seen in FIG. 5, discussed in more detail below. The mobile station then sends the time difference (t_GPS−t_est) to the communications system (arrow 404). The time difference information may be sent, for example, in a location request message. The communications system (for example, the SMLC) collects and stores the time difference information (step 405 in FIG. 4). Additional parameters can be related to the time difference information may also be stored, as FIG. 4 shows by the way of example. Some examples of these additional parameters are the time of day, nature of the data channel (transfer medium) and, if delays within the communications system may vary geographically, rough location of the communications device (for example, a location area). These additional parameters and/or the transfer delay information may be used in selecting a data channel (transfer medium) for location assistance data deliveries, where there are a number of transfer media for sending location assistance data. The communication system processes statistically collected time difference information to obtain useful information (step 406 in FIG. 4).

Figure 6:
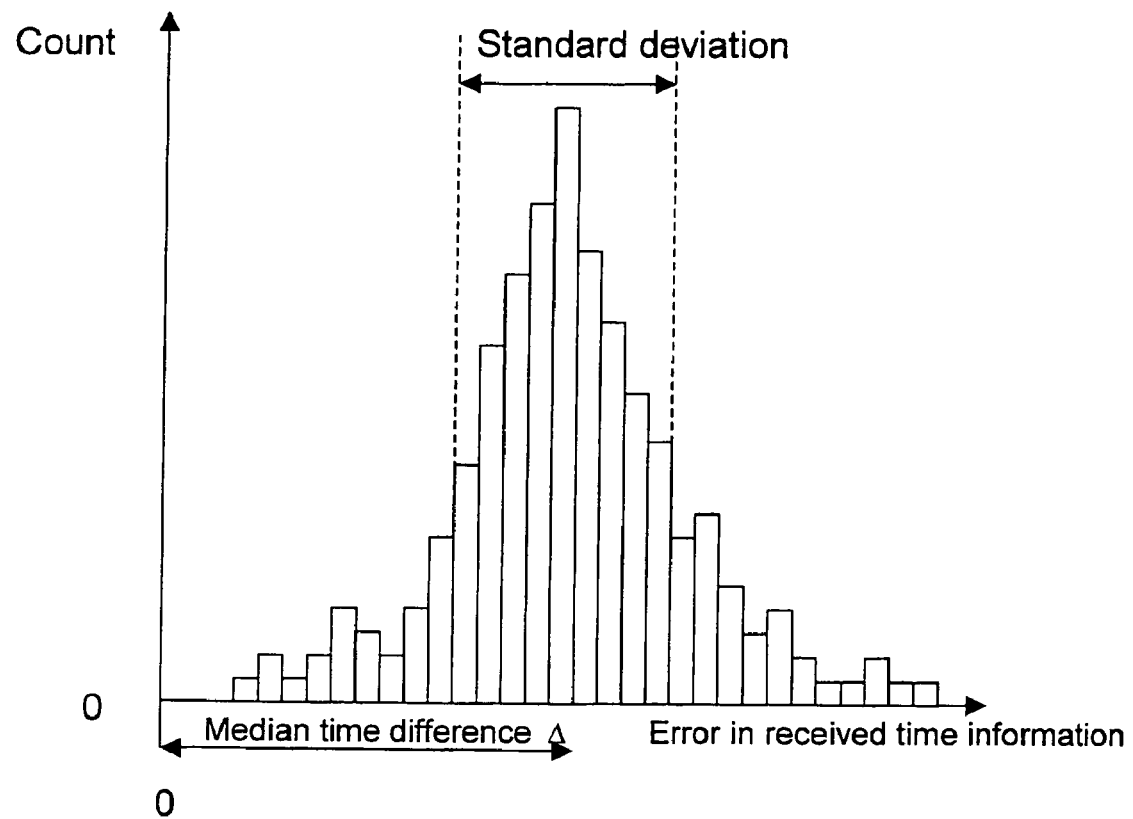
FIG. 6 shows an example of implementation of statistical analysis relating to the time error information of a transfer medium.

The statistically processed information can be used, for example, to the following purposes. It is possible to enhance the accuracy of time information for other location/assistance data delivery transactions. For example, if the time difference distribution has a certain offset (Δ as seen in FIG. 6), this can be compensated for either in the communication system before sending time information or in the communications device. In the latter case, the communications device is informed about estimated transfer delay, for example, as part of location assistance information. Δ represents here the median error in the reference time represented by the time information. It is also or alternatively possible to estimate the reliability of the reference time, for example based on standard deviation of the time difference distribution (see FIG. 6). The reliability of the reference time may be indicated to a communications device. The communications device may use the reliability information, for example, to change the size of search window for searching GPS satellite signals. Better reliability means a smaller search window, which in turn means that a satellite can be faster fixed.

Figure 5:
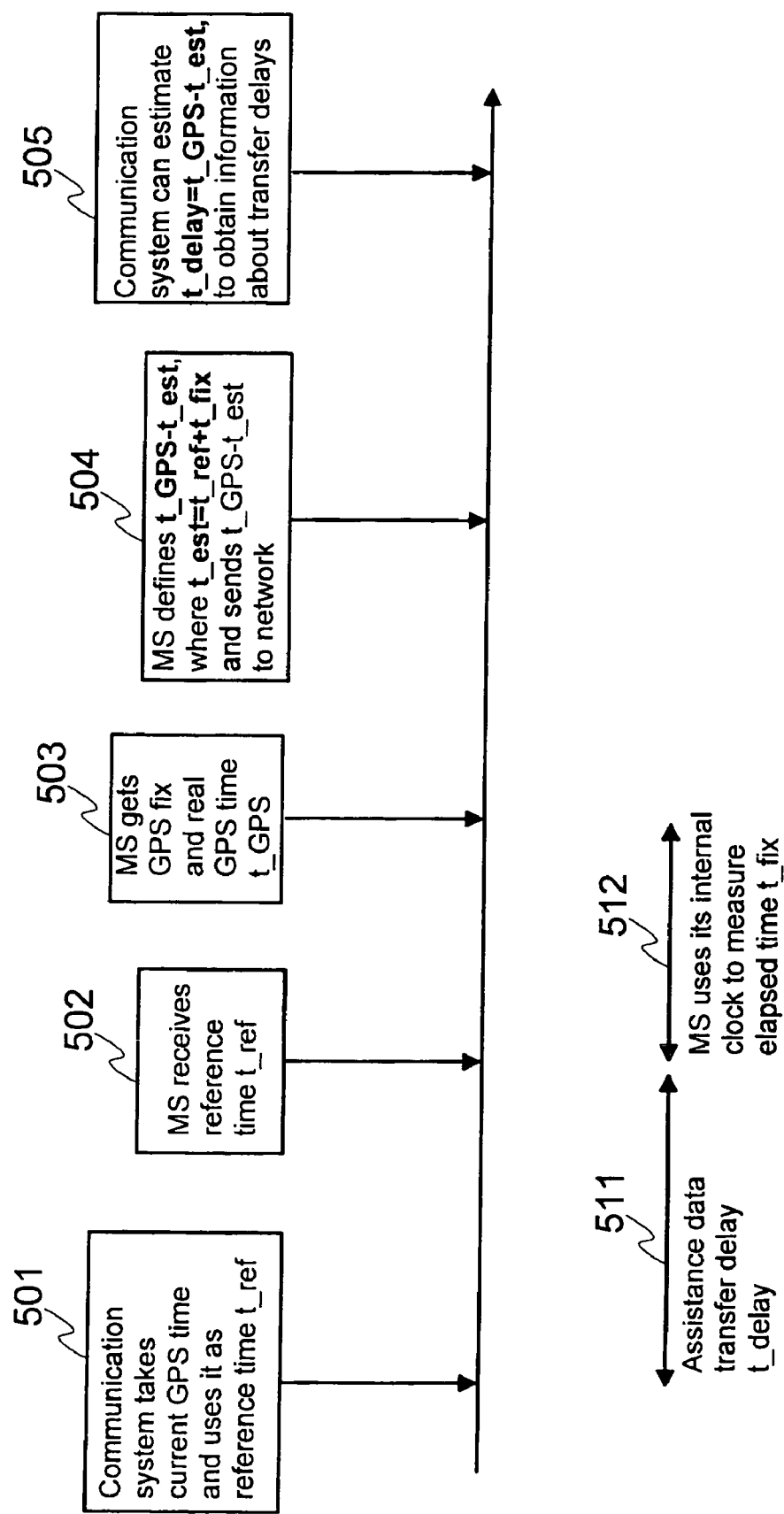
FIG. 5 shows schematically an example of implementation of determination of the error in the received time information in a communications device.

FIG. 5 shows schematically an example of implementation of determination of the error in time information in a communications device. FIG. 5 relates to GPS positioning of a mobile station containing a GPS receiver. The horizontal axis in FIG. 5 represents time. In step 501 the communication system obtains a current GPS time, for example from a GPS receiver connected to the communications system, and uses it as the reference time t_ref. This reference time t_ref is sent to a mobile station as part of location assistance information. Arrow 511 represents the transfer delay for the assistance data, and in step 502 the mobile station receives the location assistance data including the reference time t_ref. In step 503, the mobile station gets a GPR fix and real GPS time t_GPS. Between steps 502 and 503, the mobile station uses its internal clock to measure the elapsed time t_fix. Arror 512 indicates this elapsed time t_fix. In step 504, the mobile station defines the time difference between the accurate GPS time t_GPS and the estimated time t_est, the estimated time being based on the reference time received from the communications system: t_est=t_ref+t_fix. Information indicating the time difference is sent to the communications system. In step 505, the communications system, for example the SMLC, estimates a transfer delay for the location assistance data based on the received time difference information. The transfer delay is typically estimated to be the time difference t_GPS−t_est, which is received from the mobile station.

To describe the functionality of a communications device in more general terms, time information is received at a first time instance. Time with respect to an external time frame is determined at a second time instance. The communication device determines the time lapsed between the first and second time instances using a specific clock, for example its internal clock. The error in the received time information is determined based on the received time information, time information with respect to the external time frame and the time period lapsed between the first and second time instances.

FIG. 6 shows an example of implementation of statistical analysis relating to the time error information of a transfer medium. It is appreciated that if there is a plurality of transfer media, statistical analysis may be carried out for each transfer medium separately. The horizontal axis in FIG. 6 represents the error in received time information. As an example, the horizontal axis represents time difference t_GPS−t_est. The vertical axis in FIG. 6 represents the number of counts a specific time difference has been indicated. The median of the time difference values is represented with A. This median value is typically used when the effect of the transfer delay is compensated for. The reliability of the time information can be estimated using a standard deviation or other characteristics representing the width of the time difference distribution. A small the standard deviation indicates, in a statistical sense, more accurate received time information.

It is appreciated that if transfer delays in the underlying data transfer system vary too much, the accuracy of the received time information may not be greatly enhanced even with the compensation. Even in this case, however, estimation of the reliability of transfer delays on statistical grounds is possible.

Figure 7:
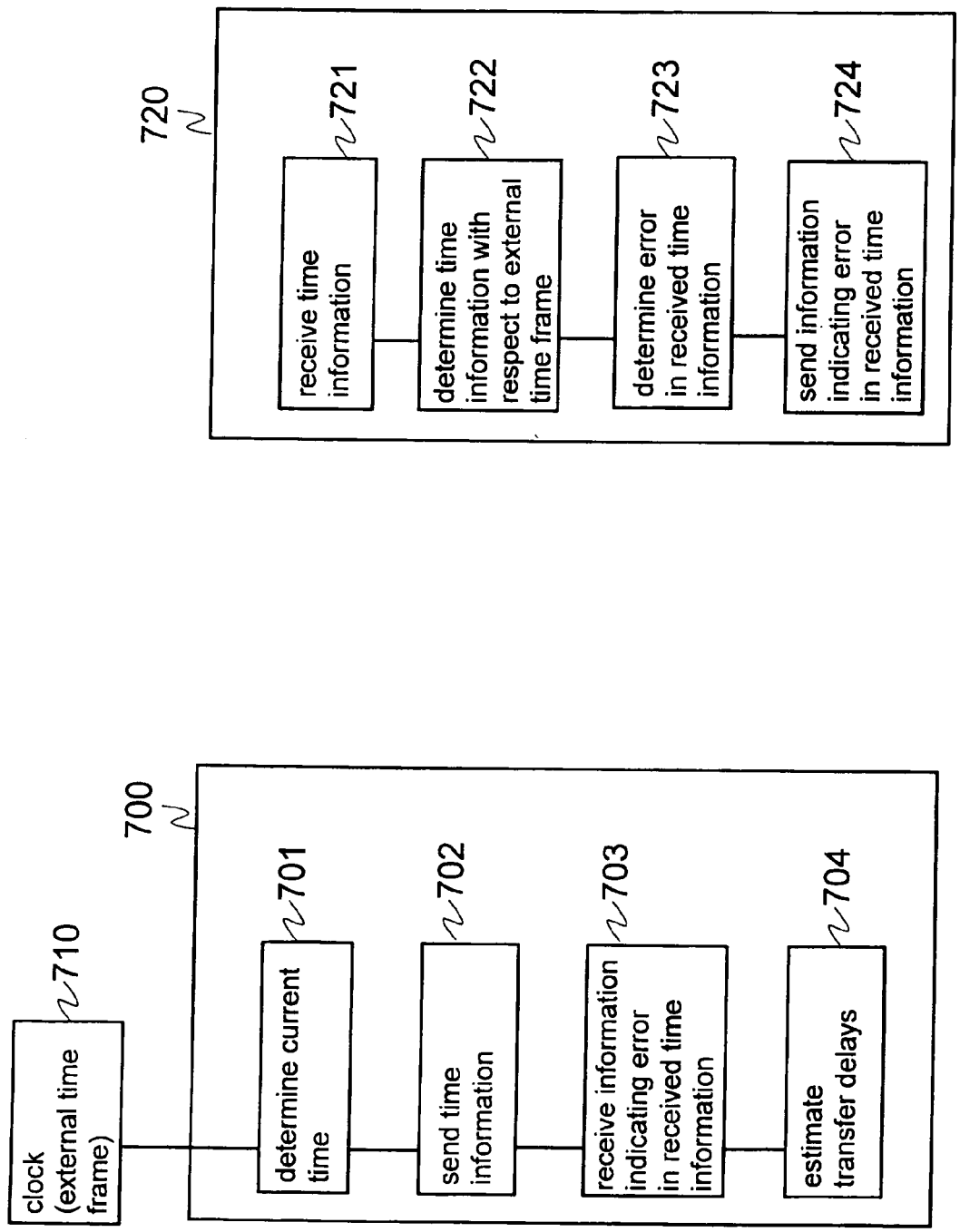
FIG. 7 shows, as examples, schematically a network element and a communications device in accordance with an embodiment of the invention.

FIG. 7 shows, as examples, schematically a network element 700 and a communications device 720 in accordance with an embodiment of the invention. The network element 700 may be, for example, a location server, more particularly a Mobile Location Center or a network server in accordance with OMA SUPL (Secure User Plane Location) specifications. An example of an OMA SUPL server is shown in FIG. 3, where a SUPL location server 36 is shown. The SUPL location server 36 may have an interface towards a SMLC 30, GMLC 32 or a Gateway GPRS Supporting Node (GGSN, not shown in FIG. 3). The GGSN is a gateway network element relating to General Packet Radio Service (GPRS). The interface to a GMLC is optional for a SUPL server 36, but an interface to SMLC 30 or to GGSN is typically required. It is appreciated that a location server may, in general, have an interface to any serving or gateway network element relating to a communications device. In a specific communications system, the relevant specifications typically dictate the optional and required interfaces.

The network element 700 is provided with a clock 710 measuring time with respect to an external time frame. The clock 710 may be implemented as a GPS receiver providing GPS time. Alternatively, the clock 710 may be a specific clock synchronized with an external time frame, for example with a GPS time frame. The network element 700 has functionality 701 for determining the current time with respect to the external time frame. Furthermore, there is functionality 702 for sending time information indicating the determined current time to a communications device. Functionality 703 is for receiving information indicating error in time information received by a communications device, and functionality 704 is for estimating transfer delay based on received error information. It is clear that further functional blocks corresponding to various further features discussed above may be implemented in the network element 700.

The communications device 720 contains functionality 721 for receiving time information from the communications system. Functionality 722 is for determining time information with respect to an external time frame. This functionality 722 may contain a receiver for receiving signals, for example, from a positioning system. Alternatively, functionality 722 may contain a special clock synchronized with the external time frame. Functionality 723 is for determining error in the first time information, and functionality 724 is for sending information indicating the error in the first time information to the network element 700.

It is appreciated that most of the functionality discussed above may be provided as software. Regarding positioning features, a receiver for location system signals is needed in the communications device 720. In the network element 700, a receiver or at least a clock synchronized with the location system time is typically needed for providing a reference time for positioning. The network element 700 may need also functionality for determining location assistance information to be sent to a communications device.

It is appreciated that an alternative implementation could be a solution where the mobile station itself collects information about transfer delays, but it is expected that the communication system can collect much larger statistics in a shorter time. It is appreciated, however, that in the appended claims the information indicating error in the received time information is meant to cover also information containing statistical information about the estimated error, not only one estimated error relating to a specific time information transfer.

Implementation of the embodiments of the invention allows sending time information relatively accurately without requiring specific hardware in the communication system for synchronizing transmissions with respect to an external time frame, for example, with respect to GPS time. Sending from a communications device information indicating error in the received time information does not cause a considerable increase in (signaling) load, especially if this information is sent in (signaling) messages that are sent in any case. As an example, the location response message is mentioned above.

Embodiments of the invention may be used, for example, for enhancing performance of assisted Global Positioning System (A-GPS) by compensating for the transfer delays relating to location assistance information. Embodiments of the invention can further be used for estimating performance of a data transfer system, for example performance of the cellular control plane signalling in GSM and UMTS, or performance of the user plane signalling. Some examples of user plane signalling are GPRS (General Packet Radio Service) and packet data. As discussed above, it is possible to select the best transfer media (for example, SMS, GPRS, or GSM data) to transfer location assistance data. Embodiments of the invention can be used for network monitoring.

Implementing embodiments of the invention may require support in specifications of relevant protocols. Some examples of relevant protocols are the 3GPP RRLP (Radio Resource LCS Protocol) protocol in GSM, the RRC (Radio Resource Control) protocol in UMTS, and in the OMA (Open Mobile Alliance) SUPL (Secure User Plane Location) protocol. These are also examples of positioning systems, where embodiments of the invention are applicable. The RRLP and RRC are signalling protocols, and the OMA SUPL is a user-plane based positioning solution.

The term communications device in this description and in the appended claims refers to a device equipped to receive and transmit information to and from a communications system. Some examples of communications devices are user equipment, mobile telephones, mobile stations, personal digital assistants, laptop computers and the like. A communications system need not be mobile, but it may be fixed to a certain position. Furthermore, a communications device need not be directly used by a human user.

It is appreciated that a communications system, a network element or a communications device may be arranged to implement any method in accordance with embodiments of the invention.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method for providing time information, the method comprises:
sending time information to at least one communications device;
receiving information indicating an error in a received time information from at least one of the at least one communications device, the error in the received time information having been determined in a communications device;
estimating a transfer delay for transferring the time information to a communications device for at least one transfer medium based on the information indicating the error in the received time information from at least one of the at least one communications device, wherein the estimating the transfer delay comprises estimating transfer delays for a plurality of transfer media; and selecting a transfer medium for sending the time information from the plurality of transfer media.

2. The method as defined in claim 1, further comprising selecting a transfer medium for sending the time information from the plurality of transfer media.

3. The method as defined in claim 2, wherein in the selecting the transfer medium is selected based on at least estimated transfer delays.

4. The method as defined in claim 1, further comprising compensating for an estimated transfer delay.

5. The method as defined in claim 4, wherein the compensating comprises taking into account the estimated transfer delay before sending the time information.

6. The method as defined in claim 4, comprising providing to the at least one communications device information indicating the estimated transfer delay for compensation.

7. The method as defined in claim 6, further comprising monitoring network performance based on estimated transfer delays.

8. The method as defined in claim 1, further comprising estimating the reliability of the time information based on an estimated transfer delay.

9. The method as defined in claim 8, comprising sending information indicating an estimated reliability of the time information to at least one communications device.

10. The method as defined in claim 1, wherein the time information comprises a reference time for positioning the communications device.

11. The method as defined in claim 1, wherein the time information is included in location assistance information relating to a positioning system.

12. The method as defined in claim 1, wherein the time information is included in a location request message.

13. The method as defined in claim 1, wherein the information indicating the error in the received time information is included in a location response message.

14. A communications system, configured to:
send time information to at least one communications device;
receive information indicating an error in a received time information from at least one of the at least one communications device, the error in the received time information having been determined in a communications device;
estimate a transfer delay for transferring the time information to a communications device for at least one transfer medium based on the information indicating the error in the received time information from at least one of the at least one communications device,
wherein the estimating the transfer delay comprises estimating transfer delays for a plurality of transfer media; and
select a transfer medium for sending the time information from the plurality of transfer media.

15. A network element for communications system, the network element configured to:
send time information to at least one communications device;
receive information indicating an error in a received time information from at least one of the at least one communications device, the error in the received time information having been determined in a communications; and estimate a transfer delay for transferring the time information to a communications device for at least one transfer medium based on the information indicating the error in the received time information from at least one of the at least one communications device,
wherein the estimating the transfer delay comprises estimating transfer delays for a plurality of transfer media; and
select a transfer medium for sending the time information from the plurality of transfer media.

16. The network element as defined in claim 15, comprising a location server.

17. A communications device, configured to:
receive a first time information from a communications system;
determine a second time information with respect to an external time frame;
determine an error in the first time information based on at least the second time information; and
send information indicating the error in the first time information to the communications system,
wherein a transfer delay is estimated for receiving the time information in the communications device for at least one transfer medium based on the information indicating the error in the first time information from the communications device,
wherein the estimating the transfer delay comprises estimating transfer delays for a plurality of transfer media; and
wherein a transfer medium is selected for sending the time information from the plurality of transfer media.

18. The communications device as defined in claim 17, comprising a receiver for positioning system signals.

19. The communications device as defined in claim 18, wherein the receiver for positioning system signals is a Global Positioning System receiver and the first time information is a reference time for positioning.

20. A method for operating a communications device, the method comprising:
receiving a first time information from a communications system;
determining a second time information with respect to an external time frame;
determining an error in the first time information based on at least the second time information; and
sending information indicating the error in the first time information to the communications system,
wherein a transfer delay is estimated for receiving the time information in the communications device for at least one transfer medium based on the information indicating the error in the first time information from the communications device,
wherein the estimating the transfer delay comprises estimating transfer delays for a plurality of transfer media; and
wherein a transfer medium is selected for sending the time information from the plurality of transfer media.

21. The method as defined in claim 20, wherein the receiving a first time information is carried out at a first time instance and the step of determining a second time information is carried out at a second time instance.

22. The method as defined in claim 21, further comprising determining a time period between the first time instance and the second time instance.

23. The method as defined in claim 22, wherein the determining an error in the first time information further comprises determining the error based on the first time information, the second time information and the time period.

24. The method as defined in claim 20, wherein the external time frame is a positioning system time frame.

25. The method as defined in claims 20, wherein the first time information is included in a location request message.

26. The method as defined in claim 20, wherein the information indicating the error is included in a location response message.

27. The method as defined in claims 20, wherein the first time information is included in location assistance information relating to a positioning system.

28. A communications device, comprising:
  means for receiving a first time information from a communications system;
  means for determining a second time information with respect to an external time frame;
  means for determining an error in the first time information based on at least the second time information; and
  means for sending information indicating the error in the first time information to the communications systems,
  wherein a transfer delay is estimated for receiving the time information in the communications device for at least one transfer medium based on the information indicating the error in the first time information from the communications device,
  wherein the estimating the transfer delay comprises estimating transfer delays for a plurality of transfer media; and
  wherein a transfer medium is selected for sending the time information from the plurality of transfer media.

29. A network element for a communications system, the network element comprising:
  means for sending time information to at least one communications device;
  means for receiving information indicating an error in a received time information from at least one of the at least one communications device, the error in the received time information having been determined in a communications device;
  means for estimating a transfer delay for transferring the time information to a communications device for at least one transfer medium based on the information indicating the error in the received time information from at least one of the at least one communications device,
  wherein the estimating the transfer delay comprises estimating transfer delays for a plurality of transfer media; and
  means for selecting a transfer medium for sending the time information from the plurality of transfer media.

30. A communications system, comprising:
  means for sending time information to at least one communications device;
  means for receiving information indicating an error in a received time information from at least one of the at least one communications device, the error in the received time information having been determined in a communications device;
  means for estimating a transfer delay for transferring the time information to a communications device for at least one transfer medium based on the information indicating the error in the received time information from at least one of the at least one communications device,
  wherein the estimating the transfer delay comprises estimating transfer delays for a plurality of transfer media; and
  means for selecting a transfer medium for sending the time information from the plurality of transfer media.

* * * * *